Dec. 8, 1959 W. R. LIPPITT 2,916,302
REMOVABLE TRAILER HITCH
Filed July 22, 1957
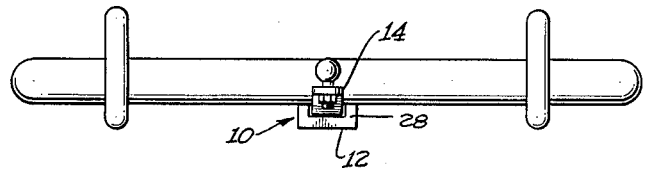
Fig. 1.
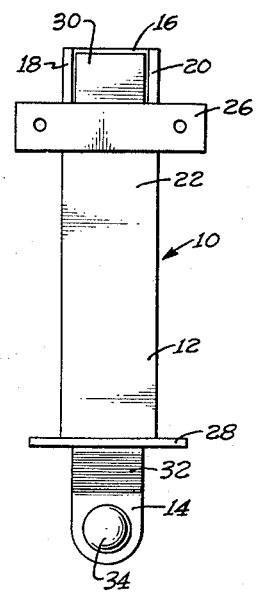
Fig. 2.
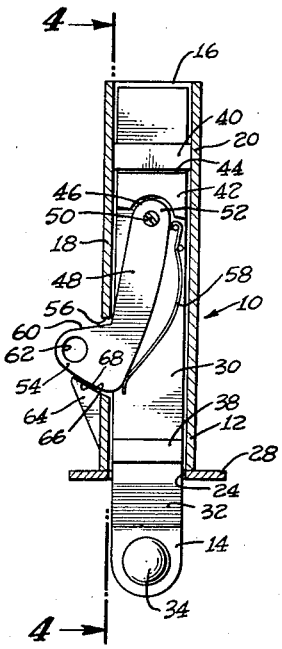
Fig. 3.
Fig. 4.
WARREN R. LIPPITT
INVENTOR.
BY
ATTORNEY.

United States Patent Office 2,916,302
Patented Dec. 8, 1959

2,916,302

REMOVABLE TRAILER HITCH

Warren R. Lippitt, Corona del Mar, Calif.

Application July 22, 1957, Serial No. 673,245

5 Claims. (Cl. 280—491)

My present invention relates to trailer hitches for motor vehicles, and it relates particularly to such a trailer hitch which includes both a fixed housing portion that is permanently mounted at the rear of the vehicle, and a removable hitch member that is selectively operatively engagable in the fixed housing portion when it is desired to pull a trailer with the vehicle, and that is selectively removable from the fixed housing portion when the hitch is not in use to remove objectionable rearward projections from the vehicle during normal use of the vehicle when it is not pulling a trailer.

It has long been a problem in the art to provide a satisfactory trailer hitch for mounting at the rear of an automobile or other motor vehicle which was removable, in order to eliminate unsightly and inconvenient projections from the rear of the vehicle when the trailer hitch was not in use.

Most prior art devices that were intended to be operated as removable trailer hitches were, in view of the difficulty of assembly and in view of the rust and corrosion problem, usually operated as fixed, permanently mounted trailer hitches.

In view of these and other problems in the art, it is an object of my present invention to provide a removable trailer hitch which comprises a fixed housing portion permanently mounted at the rear of the vehicle so as not to extend the length of the vehicle, and a removable hitch member which is selectively slideable either into or out of its operative position in the fixed housing portion of the device, with a wedging latch member operatively engageable between the removable hitch member and the fixed housing portion of the device to latch the removable hitch member into its operative position in the housing and to wedge the removable hitch member into this operative position so that the hitch member is tightly seated in the fixed housing portion of the device and unable to jiggle or rattle during operation.

Another object of my present invention is to provide a removable trailer hitch of the character described comprising a fixed housing portion and a removable hitch member that is slideably operatively engageable in the fixed housing portion, a latch member being pivotally mounted on the removable hitch member and operatively engageable against portion of the fixed housing in such a manner that the latch member will tend to cinch the removable hitch member progressively more tightly into its operative, seated position within the fixed housing as the removable hitch member tends to move relative to the housing during operation of the trailer hitch to pull a trailer.

Other objects and advantages of my present invention will be apparent from the following description and claims, the novelty of my invention consisting in the features of construction, the combinations of parts, the novel relations of the members and the relative proportioning, disposition and operative thereof, all as is more completely described herein and as is more particularly pointed out in the appended claims.

In the accompanying drawings, forming a part of my present specification:

Figure 1 is a rear elevation view of an automobile bumper illustrating the presently preferred orientation of my present invention relative to the bumper.

Figure 2 is a top plan view of my trailer hitch in its assembled form with the removable hitch member operatively positioned in the fixed housing portion of the device.

Figure 3 is a top plan view similar to Figure 2, with a portion of the top wall of the fixed housing removed to illustrate the details of construction of my invention and the manner in which it operates.

Figure 4 is a vertical section along the line 4—4 in Figure 3 further illustrating the internal details of construction of my invention.

Referring now to my drawings, my trailer hitch 10 comprises two principal parts, an elongated fixed housing portion 12 adapted to be permanently attached to the rear portion of the vehicle frame, and an elongated hitch member 14 that is slideably engageable in the housing portion 12.

The fixed housing portion 12 of my trailer hitch 10 is preferably substantially rectangular in cross-section, and includes a flat bottom wall 16, a pair of generally parallel vertical side walls 18 and 20, and a top wall 22. In this manner, the bottom wall 16, side walls 18 and 20, and top wall 22 provide a tube having a generally rectangular cross-section, with an opening 24 at the rear thereof through which the removable hitch member 14 is received.

Although my fixed housing portion 12 may be attached to the rear of the vehicle in any desired manner, in the embodiment of my present invention illustrated in the drawings I have illustrated a front mounting bracket 26 that is disposed across the top of housing portion 12 and integrally attached thereto in any conventional manner, such as by welding. This front mounting bracket 26 is attachable to a vehicle frame member in any conventional manner, such as by means of a plurality of bolts (not shown). I provide a rear mounting bracket 28 which comprises a vertical plate member integrally attached to the rear end of the fixed housing 12 and extending upwardly therefrom so that the rear mounting bracket 28 may be attached to a rear frame or bumper support member of the vehicle in any conventional manner. Although I have illustrated my rear mounting bracket 28 as a rear cover plate, it will be obvious that any other type of rear mounting bracket member may be utilized, and it is not necessary that this member also function as a cover plate.

My removable hitch member 14 is composed principally of an elongated flat bar 30 that is adapted to seat against the inner surface of bottom wall 16 of fixed housing portion 12 when the removable hitch member 14 is in its operative position. The elongated flat bar 30 is provided with an upward bend 32 at its rear end, although such a bend is not essential, and a conventional trailer hitch ball 34 is mounted on the rear of bar 30 by means of the usual nut 36.

Integrally attached to the upper surface of bar 30 near the rear bend 32 is a positioning lug 38 which, together with the bar 30, fills the rear end of the tubular housing 12 when the removable hitch member 14 is fully seated within the housing 12.

A stop member 40 is integrally attached between the side walls 18 and 20 of fixed housing 12, the stop member 40 projecting down into the housing cavity below top wall 22. For convenience of manufacture I have terminated the top wall 22 somewhat to the rear of the front end of the fixed housing 12, and have integrally attached the stop member 40 directly to the side walls 18 and 20 just forward of the front end of top wall 22. I have then integrally attached the front mounting bracket 26 over the top of stop member 40, welding the front mounting bracket 26 to the upper edges of side walls 18 and 20 and also to the top wall 22 along its forward edge. It will be obvious that these various parts may be assembled in a number of different ways, according to the convenience of manufacture.

I provide an upwardly projecting boss 42 which is integrally attached to the elongated flat bar 30 somewhat rearward of the forward end of bar 30, boss 42 having a forwardly directed shoulder 44 that is adapted to seat against the stop member 40 when the removable hitch member 14 is in its forwardmost, seated position within the fixed housing 12.

I provide an arcuate shoulder 46 along the rear edge of boss 42 which is adapted to receive the forward end of a pivoted latch arm 48. The latch arm 48 is loosely pivotally mounted on a screw 50 that is screwed into the bar 30 just to the rear of boss 42 at substantially the center of the arcuate shoulder 46 on boss 42. The forward end 52 of latch arm 48 is provided with an arcuate curve that is complementary to the arcuate shoulder 46. In this manner, when the latch arm 48 is latched against the fixed housing 12 in the manner hereinafter fully described and a substantial rearward force is applied to the bar 30, the arcuate end 52 of latch arm 48 will seat in the complementary arcuate shoulder 46 of boss 42 to provide a pivotal engagement of substantial surface area between these two members. The screw 50 merely serves to hold the latch arm 48 in its operative position on bar 30.

I provide a laterally projecting head member 54 on latch arm 48 substantially to the rear of the screw 50, this head member 54 being adapted to fit through an opening 56 in side wall 18 when the removable hitch member 14 is operatively engaged in the fixed housing 12. Latch arm 48 is normally urged in a clockwise direction in Figure 3 by means of a spring 58 mounted on bar 30. In this manner, the latch head 54 will be disposed through the opening 56 in wall 18 when the removable hitch member 14 is in its operative position in fixed housing 12. The forward edge 60 of head member 54 is suitably beveled so that the latch arm 48 will be cammed to the right in Figure 3 as it engages the rear end of the fixed housing 12 when the removable hitch member 14 is slid forwardly into the fixed housing 12. As the removable hitch member 14 is further slid forwardly in the fixed housing 12, the latch arm 48 will snap to the left in Figure 3 as the head member 54 comes opposite the opening 56 in wall 18.

The head member 54 is provided with a hole 62 through which a safety member, such as a safety chain, may pass, to prevent any accidental unlatching of the latch arm 48 from its operative position as shown in Figure 3 of the drawing.

I provide an abutment member 64 which is preferably continuous with the rear edge of opening 56 through wall 18 of fixed housing 12 and which extends laterally outwardly from the wall 18. Abutment member 64 has a forward surface 66 which is complementary to the rearwardly directed surface 68 of head member 54. The radius from the latch arm pivoting center to the rear end of the latch arm 48 is greater than the normal distance from the surface 66 to the pivoting center of latch arm 48.

The tilted surface 68 on latch head 54 is preferably curved as shown in Figure 3 on an arc having its center slightly to the right of the screw 50 in Figure 3, and surface 66 on abutment member 64 may be similarly curved if desired. However, the surfaces 66 and 68 may be substantially flat if desired, the surface 66 being shown as a flat surface in Figure 3.

The fact that the radius from the latch arm pivoting center to the rear end of latch arm 48 is greater than the normal distance from surface 66 to the latch arm pivoting center permits the latch head surface 68 to wedge tightly against the abutment member surface 66 as the latch head 54 moves to the left through opening 56 in wall 18, this wedging forcing the entire removable hitch member 14 inwardly into its seated position in fixed housing 12, with the forward shoulder 44 of boss 42 on bar 30 tightly engaging the stop member 40. In this manner, the removable hitch member 14 is tightly locked in its operative position, and prevented from jiggling or rattling, even when a heavy trailer is being pulled by the vehicle.

I have found in practice that my latch mechanism has a tendency to tighten up upon any slight shifting movement of the removable hitch member 14 in the fixed housing 12. This is caused by several factors. Although the spring member 58 is not a particularly heavy spring, it easily urges the latch arm 48 to the left in Figure 3 with sufficient force to tightly wedge the entire removable hitch member 14 within the fixed housing 12. This is true because of the only very slight tilting of the abutting surfaces 66 and 68 clockwise of a tangent line, which provides a great deal of leverage to the wedging action.

The only force which would tend to urge the latch arm 48 anti-clockwise in Figure 3 would be the reaction force of the surface 66 of abutment member 64 against the head surface 68, this reaction force being directed slightly to the right of the screw 50 so that it acts through a slight moment arm. However, the tilting of surfaces 66 and 68 is so slight relative to the tangent or circle about the pivoting center of latch arm 48 that this anti-clockwise torque on the latch arm 48 is only slight, and is actually ineffective to move the latch arm 48 anti-clockwise relative to the housing 12 and bar 30 because of the friction between the surfaces 66 and 68.

A further factor which tends to cause the latching mechanism to cinch up when my trailer hitch 10 is in operation, even without the use of the spring member 58, is the clockwise inertia of the latch arm 48 upon any forward jarring movement of the removable hitch member 14 in the fixed housing 12. Thus, although a rearward jarring movement of removable hitch member 14 in housing 12 when the latch is not absolutely tight will not tend to cause any anti-clockwise movement of the latch arm 48 in spite of the inertia of latch arm 48 and the slight tendency of the head surface 60 to cam against the abutment surface 66 because of the frictional engagement of surface 68 against surface 66, when the removable hitch member 14 jars forwardly the inertia of latch arm 48 is free to actually rotate latch arm 48 clockwise to further tighten up the latch because there is at this time no substantial frictional engagement between the surfaces 66 and 68.

It will thus be seen that my present invention has an inherent tendency to gradually tighten itself up during operation, this tendency being present even without the presence of spring 58, but to a greater degree with the spring 58. My trailer hitch 10 is therefore a very secure and rigid hitch during operation, without the usual problem of rattling or jiggling and the usual accompanying wear and fatigue on parts.

The only moving parts in my device are found on my removable hitch member 14 which is normally stowed in a dry place, such as in the trunk of a car. By thus providing no movable parts on the fixed housing portion 12 of my trailer hitch 10 I do not provide any parts which remain fixed on the outside of the vehicle that are likely to rust or corrode or become otherwise damaged insofar as the operation of the device is concerned. I do not provide any small bolt holes or the like in my fixed housing portion 12 which must be engaged when my removable hitch member 14 is operatively positioned in fixed housing portion 12, so that rust or debris in such bolt holes or the like is not a problem in connection with my present invention.

By providing a wedging type of latch mechanism, the tolerances in my present invention are sufficiently great that rust, corrosion and debris do not particularly adversely effect the operation of my invention.

It is to be understood that the form of my invention herein shown and described is my preferred embodiment and that various changes in the shape, size and arrangement of parts may be resorted to without departing from the spirit of my invention, or the scope of my appended claims.

I claim:

1. A trailer hitch comprising a fixed tubular housing member attachable to the rear portion of a vehicle, an elongated movable hitch member forwardly slideable into said housing member, a rearwardly directed shoulder on said housing member and a forwardly directed shoulder on said hitch member, said shoulders being operatively engageable when said members are in their fully engaged position, an elongated latch arm pivotally mounted on said hitch member and extending rearwardly from its pivot substantially longitudinally adjacent to said hitch member within said housing member when said members are in their fully engaged position, an opening through the wall of said housing member through which a rear portion of said latch arm extends when said latch arm is in the latching position, a forwardly directed abutment face formed on said housing member adjacent the rear edge of said housing wall opening, a rearwardly directed latch face on said latch member operatively engageable with said abutment face when said latch arm is in the latching position, and means for urging said latch arm into an engaging position with said faces operatively engaged, said faces being tilted so that pivoting of said latch arm in the latching direction wedges said engaging shoulders of said members together.

2. The apparatus of claim 1 in which said last mentioned means includes spring means operatively engaging said hitch member and said latch arm for urging said latch arm into its said engaging position.

3. The apparatus of claim 1 in which the portion of said latch arm that extends through said opening through said housing member wall is provided with a passage through which a safety member may be selectively engaged.

4. The apparatus of claim 1 in which the center of mass of said latch arm is laterally spaced from the latch arm pivot toward said housing member opening, whereby any rearward jarring movement of said hitch member relative to said housing member will tend to jar said latch arm further into latching engagement with said housing member.

5. The apparatus of claim 4 in which said last mentioned means includes spring means operatively engaging said hitch member and said latch arm for urging said latch arm into its said engaging position.

References Cited in the file of this patent

UNITED STATES PATENTS

| | | |
|---|---|---|
| 2,484,751 | Schultz | Oct. 11, 1949 |
| 2,685,457 | Van Zee | Aug. 3, 1954 |
| 2,717,163 | Martin | Sept. 6, 1955 |
| 2,833,563 | Pruitt | May 6, 1958 |